United States Patent
Zhan et al.

(10) Patent No.: US 11,442,162 B2
(45) Date of Patent: Sep. 13, 2022

(54) MILLIMETER WAVE RADAR MODELING-BASED METHOD FOR OBJECT VISIBILITY DETERMINATION

(71) Applicant: JILIN UNIVERSITY, Jilin (CN)

(72) Inventors: Jun Zhan, Jilin (CN); Xuecai Dong, Jilin (CN); Chunguang Duan, Jilin (CN); Zhangu Wang, Jilin (CN); Rong Liu, Jilin (CN); Kai Yang, Jilin (CN); Huainan Zhu, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 257 days.

(21) Appl. No.: 16/825,416

(22) Filed: Mar. 20, 2020

(65) Prior Publication Data

US 2020/0319334 A1 Oct. 8, 2020

(30) Foreign Application Priority Data

Apr. 4, 2019 (CN) .......................... 201910270687.3

(51) Int. Cl.
| | |
|---|---|
| *G01S 13/931* | (2020.01) |
| *G01S 7/40* | (2006.01) |
| *G01S 13/52* | (2006.01) |

(52) U.S. Cl.
CPC .............. *G01S 13/931* (2013.01); *G01S 7/40* (2013.01); *G01S 13/52* (2013.01)

(58) Field of Classification Search
CPC ........... G01S 13/931; G01S 7/40; G01S 13/52
See application file for complete search history.

(56) References Cited

U.S. PATENT DOCUMENTS

| 2014/0049420 A1* | 2/2014 | Lehning | G01S 13/91 |
| | | | 342/109 |
| 2018/0182247 A1* | 6/2018 | Baba | G06V 20/56 |

OTHER PUBLICATIONS

Naoyiki Yamada, Radar Cross Section for Pedestrian in 76GHz Band, Oct. 4-6, 2005, IEEE. (Year: 2005).*
Guo et al., "A Novel Method of Radar Modeling for Vehicle Intelligence," SAE Int. J. Passeng. Cars—Electron. Electr. Syst. vol. 10, Issue 1:pp. 50-56, May 2017; https://doi.org/10.4271/2016-01-1892.

(Continued)

*Primary Examiner* — Vladimir Magloire
*Assistant Examiner* — Artem Melkunov
(74) *Attorney, Agent, or Firm* — Berenato & White, LLC (57) ABSTRACT

The invention provides a millimeter wave radar modeling-based method for object visibility determination, to solve the problem of object visibility determination based on virtual sensor modeling in intelligent vehicle simulation and testing, and improve the fidelity of sensor modeling while meeting simulation efficiency requirements. It includes the steps of target vehicle information detection to obtain target vehicle information; target vehicle reflection intensity simulation: for each target vehicle performing geometry culling on the target vehicle, discarding completely-invisible target vehicles, and calculating visible section information for each target vehicle that has a visible section, and reflection intensity calculation; target vehicle visibility determination: analyzing visibility of the target vehicle according to the target vehicle reflection intensity, and converting and outputting information of a visible object into an expression form of a real millimeter-wave radar sensing an object.

8 Claims, 7 Drawing Sheets

(56) References Cited

OTHER PUBLICATIONS

Hong, Feng, "Research on Comprehensive Cognition of Traffic Vehicles and Virtual Test for Intelligent Vehicle", Jilin University China. Dissertation, Jun. 2018. [English Langauage Abstract Included in Text].

Zhang, Sumin, "Study on Simulation Platform for Automotive Electronic Control System", Jilin University China. Dissertation, Jun. 2011. [English Langauage Abstract Included in Text].

Zhao et al., "Research of Radio Frequency Environment Algorithms for Radar System of System Combat Simulation," Journal of System Simulation. vol. 27 No. 1:pp. 63-68, Jan. 2015; DOI:10.16182/j.cnki.joss.2015.01.008. [English Langauage Abstract Included in Text].

\* cited by examiner

MILLIMETER WAVE RADAR MODELING-BASED METHOD FOR OBJECT VISIBILITY DETERMINATION

CROSS-REFERENCE TO RELATED APPLICATIONS AND CLAIM TO PRIORITY

This application is related to Patent Application No. 201910270687.3 filed Apr. 4, 2019 in China, the disclosure of which is incorporated herein by reference and to which priority is claimed.

FIELD OF THE INVENTION

The invention relates to intelligent vehicle testing and validation, and in particular to a millimeter wave radar modeling-based method for object visibility determination.

BACKGROUND AND SUMMARY OF THE INVENTION

Virtual testing is widely recognized as the most effective way to intelligent vehicle development. Virtual sensor modeling is one of the most important elements of the virtual testing of intelligent vehicles; the fidelity of the virtual sensor model determines how much a virtual testing can replace a real testing. In virtual sensor models, visibility analysis is usually through geometry culling or ray tracing, which uses only geometric and graphics algorithms, without considering the effects of millimeter-wave propagation and reflection, and thus cannot represent the physical characteristics of the millimeter wave radar. The invention provides an object visibility determination method using the reflection intensity from an object, which simulates the reflection of waves in real millimeter wave radar detection, and, because different object positions, attitudes, materials, shapes or areas lead to different reflection intensities, more accurately represents the reflection process of the millimeter wave radar, reflects the performance of a virtual radar, and greatly improves the fidelity of the millimeter wave radar model.

Currently in established millimeter-wave radar models, object visibility can be determined through two approaches. One approach includes simple geometry culling and comparing an object visible length with a threshold after culling. For example, in *A Novel Method of Radar Modeling for Vehicle Intelligence*, Guo Jiao proposed a millimeter wave radar model in which object extraction and visibility determination are through frustum culling: first a target vehicle is simplified into a bounding box and feature points are selected, then visibility of the target vehicle is determined by judging the positional relationship between the feature points and the frustum. In a doctoral dissertation, Zhang Sumin also mentioned an approach for identifying visible objects in a radar sensor model using geometry culling, which includes judging the spatial relationship between a geometrical shape of an object and a cone representing the working area of an on-vehicle radar sensor. Similarly, Hong Feng in his doctoral dissertation proposed a sensor model in which object visibility analysis is by geometry culling on a two-dimensional plane, determining occlusion and comparing an object visible length. The other sensor modeling-based approach for object visibility determination is ray tracing. For example, Zhao Xinjun proposed a radio frequency radar system in a publication, discussing and analyzing the principles and algorithms under a radio frequency environment and using a ray tracing approach to determine object visibility. In addition, no method using reflection intensity has been reported for object visibility determination in a sensor model.

In view of the above, the invention adopts a different approach than previous research. Considering that different object positions, angles, materials, shapes or areas lead to different reflection intensities, object reflection intensity is introduced to determine and analyze object visibility. In order to meet simulation efficiency requirements, the invention mainly includes, on the basis of geometry extraction, calculating the position of a visible section and the area of reflection of an object, to obtain a reflection intensity of the object, and determining the visibility of the object according to a reflection intensity threshold.

Accordingly, an object of the invention is to provide a new millimeter wave radar modeling-based method for object visibility determination within the visibility area of the millimeter wave radar, to solve the problem of object visibility determination based on virtual sensor modeling in intelligent vehicle simulation and testing, and improve the fidelity of sensor modeling while meeting simulation efficiency requirements.

To achieve the object above, the invention provides the following solution:

A millimeter wave radar modeling-based method for object visibility determination includes the following steps:
  Step 1: Target vehicle information detection to obtain target vehicle information:
  obtaining information of a target vehicle at a variety of positions and a variety of angles within a detection area of a host vehicle, where the target vehicle is being detected by the host vehicle, and the information includes a vehicle type, shape, size, material, position, speed, acceleration, moving direction and reflectivity of the target vehicle, according to vehicle types stored in an intelligent vehicle simulation testing model, and calibrated reflectivities of the vehicle types at a variety of positions within 360 degrees within a millimeter wave radar, and building a linked list for storage;
  Step 2: Target vehicle reflection intensity simulation:
  for each target vehicle obtained in Step 1 performing geometry culling on the target vehicle, discarding completely invisible target vehicles, and calculating visible section information for each target vehicle that has a visible section, the visible section information including a position of the visible section and a corresponding angle;
  in reflection intensity calculation, categorizing target vehicles into four classes according to their moving directions relative to the host vehicle: the target vehicle moves in the same direction as the host vehicle; the target vehicle moves in the opposite direction of the host vehicle; the target vehicle moves to the left relative to the host vehicle; and the target vehicle moves to the right relative to the host vehicle, and further dividing each class into a plurality of situations according to a positional relationship between the visible section and the host vehicle, and calculating a target vehicle reflection intensity according to the situation;
  Step 3: visibility determination:
  analyzing visibility of the target vehicle according to the target vehicle reflection intensity calculated from Step 2, and converting and outputting information of a visible target vehicle into an expression form of a real millimeter-wave radar sensing an object.

In Step 2 of the millimeter wave radar modeling-based method for object visibility determination, the target vehicle reflection intensity calculation includes finding a reflectivity of the target vehicle at a corresponding area from the calibrated reflectivities according to the position and angle of the current target vehicle, determining a situation in a class according to the position of the visible section, and obtaining an object reflection intensity of the target vehicle by calculating an integral on an angle interval corresponding to the visible section and multiplying a height of the target vehicle type.

In Step 2 of the millimeter wave radar modeling-based method for object visibility determination, the class where the target vehicle moves in the same direction as the host vehicle includes three situations: $f_{lrcorner}$ feature, $f_{rrcorner}$ feature and $f_{rearside}$ feature:

the $f_{lrcorner}$ feature indicates that the target vehicle visible section starts from the center of the rear end of the vehicle and runs the contour of the vehicle to the top left corner;

the $f_{rrcorner}$ feature indicates that the target vehicle visible section starts from the center of the rear end of the vehicle and runs the contour of the vehicle to the top right corner;

the $f_{rearside}$ feature indicates that the target vehicle visible section starts from the left side to the right side of the rear end of the vehicle.

In Step 2 of the millimeter wave radar modeling-based method for object visibility determination, the class where the target vehicle moves in the opposite direction of the host includes three situations: $f_{rfcorner}$ feature, $f_{lfcorner}$ feature, and $f_{frontside}$ feature:

the $f_{rfcorner}$ feature indicates that the target vehicle visible section starts from the center of the front end of the vehicle and runs the contour of the vehicle to the top right corner;

the $f_{lfcorner}$ feature indicates that the target vehicle visible section starts from the center of the front end of the vehicle and runs the contour of the vehicle to the top left corner;

the $f_{frontside}$ feature indicates that the target vehicle visible section starts from the left side to the right side of the front end of the vehicle.

In Step 2 of the millimeter wave radar modeling-based method for object visibility determination, the class where the target vehicle moves to the left relative to the host vehicle includes three situations: $f_{flcorner}$ feature, $f_{rlcorner}$ feature, and $f_{leftside}$ feature:

the $f_{flcorner}$ feature indicates that the target vehicle visible section starts from the center of the left side of the vehicle and runs the contour of the vehicle to the top corner at the front end;

the $f_{rlcorner}$ feature indicates that the target vehicle visible section starts from the center of the left side of the vehicle and runs the contour of the vehicle to the top corner at the rear end;

the $f_{leftside}$ feature indicates that the target vehicle visible section starts from the front to the end of the left side of the vehicle.

In Step 2 of the millimeter wave radar modeling-based method for object visibility determination, the class where the class where the target vehicle moves to the right of the host vehicle includes three situations: $f_{rrcorner}$ feature, $f_{rfcorner}$ feature, and $f_{rightside}$ feature:

the $f_{rrcorner}$ feature indicates that the target vehicle visible section starts from the center of the right side of the vehicle and runs the contour of the vehicle to the top corner at the rear end;

the $f_{rfcorner}$ feature indicates that the target vehicle visible section starts from the center of the right side of the vehicle and runs the contour of the vehicle to the top corner at the front end;

the $f_{rightside}$ feature indicates that the target vehicle visible section starts from the front to the end of the left side of the vehicle.

In Step 2 of the millimeter wave radar modeling-based method for object visibility determination, in the case where the course angle of the target vehicle changes relative to the host vehicle:

the target vehicle moves in the same direction as the host vehicle when the course angle of the target vehicle ranges from 0 to 45° or 315° to 360°;

the target vehicle moves to the left relative to the host vehicle when the course angle of the target vehicle ranges from 45° to 135°;

the target vehicle moves in the opposite direction of the host vehicle when the course angle of the target vehicle ranges from 135° to 225°;

the target vehicle moves to the right of the host vehicle when the course angel of the target vehicle ranges from 225° to 315°.

Step 2 of the millimeter wave radar modeling-based method for object visibility determination may further include: calculating a vector projection of the obtained reflection intensity, considering the angle between the target vehicle and the radar, which causes refraction loss, and based on calculating a position vector of the current target vehicle relative to the radar, which includes: supposing the visible section has endpoints A and B, the midpoint of the line AB is $O_1$, the mounting position of the radar, i.e., is O, obtaining an actual object reflection intensity by calculating the vector projection of the obtained reflection intensity onto the line segment $OO_1$.

Step 3 of the millimeter wave radar modeling-based method for object visibility determination may further include: sequentially extracting relevant data from the target vehicle reflection intensity result list obtained from step 2, determining whether a target vehicle reflection intensity result is greater than a target vehicle reflection intensity visibility threshold in the simulated sensor, and if the target vehicle reflection intensity result is greater than the target vehicle reflection visibility intensity threshold, determining the inputted object is visible to the simulated sensor, and converting and outputting the information of the target vehicle such as position, angle, speed and acceleration obtained in the simulation scene according to an output data format required by the current radar model; if the target vehicle reflection intensity result is not greater than the target vehicle reflection intensity visibility threshold, determining the inputted object is invisible to the simulated sensor. In the calculation above, the target vehicle intensity visibility threshold may be defined a reflection intensity value of the target vehicle when the simulated sensor can effectively identify the target vehicle.

DETAILED DESCRIPTION OF THE PREFERRED EMBODIMENT(S)

For a better understanding of the object of the invention, technical solution and advantages of the invention, particular embodiments of the invention will be described in detail in conjunction with the accompanying drawings. The embodiments described herein are for illustrative purposes only, and shall not be construed as limiting the scope of the present invention.

An object of the invention is, for millimeter wave radar modeling in intelligent vehicle testing and validation, to provide a new millimeter wave radar modeling-based method for object visibility determination within the visibility area of the millimeter wave radar, to solve the problem of object visibility determination based on virtual sensor modeling in intelligent vehicle simulation and testing, and improve the fidelity of sensor modeling while meeting simulation efficiency requirements.

Figure 1:
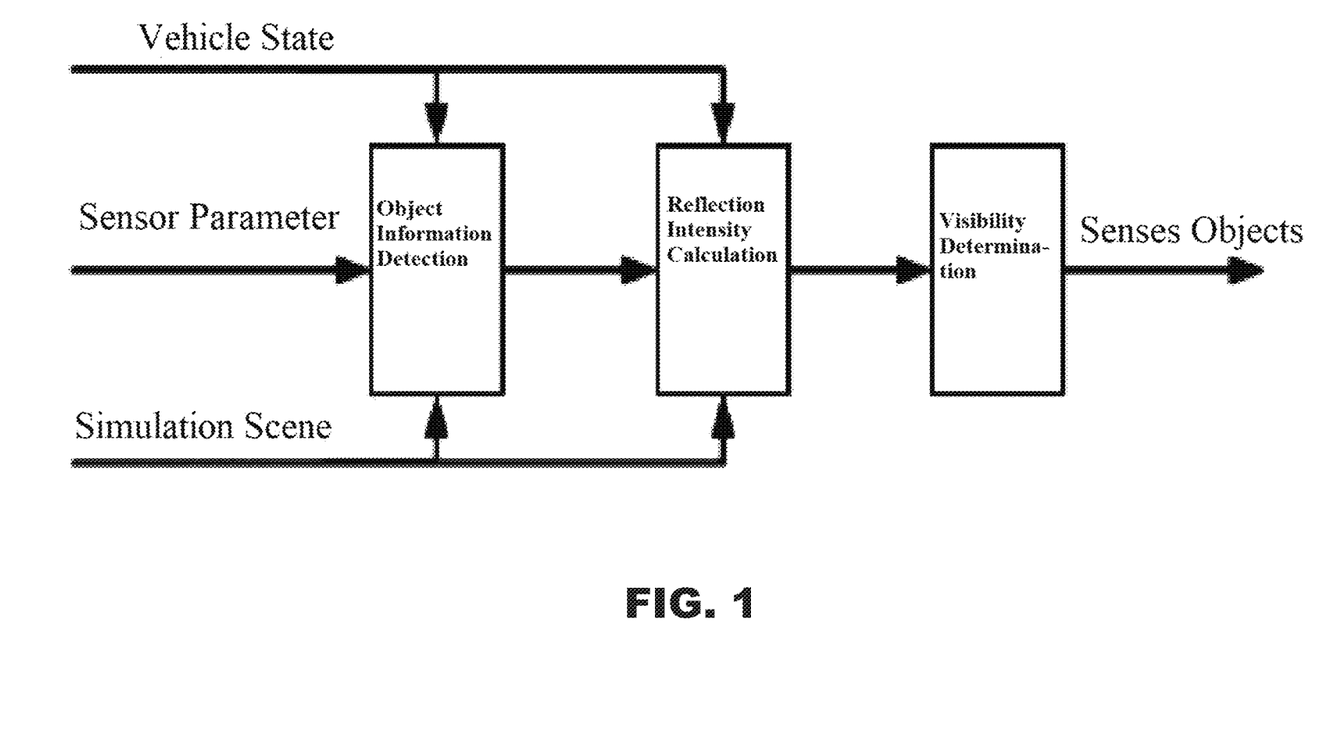
FIG. 1 is a flow chart of the millimeter wave radar modeling-based method for object visibility determination.

As shown in FIG. 1, the method according to the invention includes three steps: object information detection, reflection intensity simulation and visibility determination. In the invention, vehicle status mainly includes motion of the vehicle, including position, attitude, speed and acceleration. Sensor parameters mainly include function parameters and performance parameters of the simulated sensor. Simulation scenes mainly include objects perceivable by the sensor and relating attributes, including vehicles and their attributes, such as vehicle type, shape, size, material, position, speed, accelerations, moving directions and reflectivity.

Object information detection is to obtain information of a detection object, which includes obtaining a vehicle type, position, angle, material, shape, speed, acceleration, moving direction and reflectivity of the detection target. Reflection intensity simulation includes calculating a reflection intensity of a visible section of the object in the detection area of a millimeter wave radar. Visibility determination includes analyzing the visibility of the object according to the calculated object reflection intensity, and converting and outputting information of a visible object into an expression form of a real millimeter-wave radar sensing an object.

Embodiments

Figure 2:
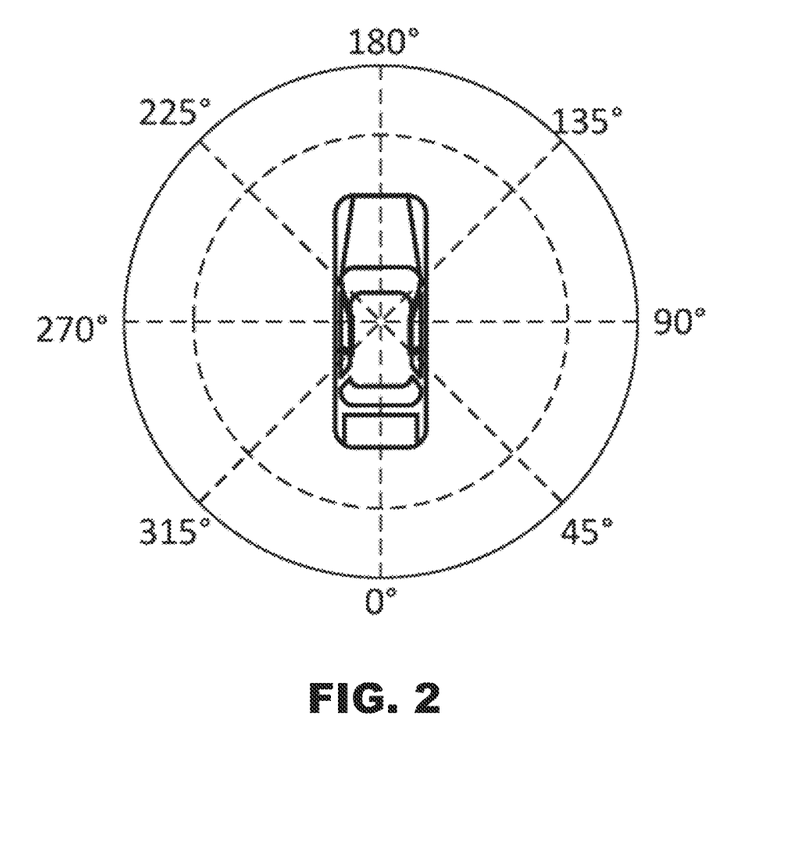
FIG. 2 is a schematic diagram illustrating the rotation angle of the vehicle.

Prior to target vehicle information detection, a scene module and a vehicle dynamics module in the simulation testing simulator are used to produce a scene culling position and a culling range of a simulation scene according to inputted parameters of a simulated host-vehicle sensor, a mounting position and an angel of the simulated sensor and a shape and a size of the detection area of the simulated sensor, and a motion position of the host vehicle, to perform culling on a traffic participant in the scene, and obtain a corresponding attribute. For example, the traffic participant may be a vehicle. In the description below, the traffic participant is a vehicle (i.e., the target vehicle) by default. It is defined that the target vehicle is at 0 degrees when its head points in the positive direction of the X-axis, as shown in FIG. 2.

According to an embodiment of the invention, a millimeter wave radar modeling-based method for object visibility determination includes the following steps.

Step 1: Target Vehicle Information Detection, which Mainly Includes Obtaining Target Vehicle Information.

The target vehicle information detection may include: obtaining information of a target vehicle at a variety of positions and a variety of angles within a detection area of a host vehicle where the target vehicle is being detected by the host vehicle, and the information includes a vehicle type, shape, size, material, position, speed, acceleration, moving direction and reflectivity of the target vehicle, according to vehicle types stored in an intelligent vehicle simulation testing model and calibrated reflectivities of the vehicle types at a variety of positions within 360 degrees within a millimeter wave radar, and building a linked list for storage. In order to improve calculation efficiency, according to an embodiment the vehicle type is simplified as an OBB (Oriented Bounding Box), and for example the vehicle may be 1.8 m wide by 4.2 m long and 1.6 m tall. In addition, it is understood that the calibrated reflectivity already reflects the material of a vehicle; and hence the material information does not need to be considered separately. In an embodiment, the moving direction of a target vehicle may be defined such that the target vehicle moves in the same direction as the host vehicle when the course angle of the target vehicle ranges from 0 to 45° or 315° to 360°; the target vehicle moves to the left relative to the host vehicle when the course angle of the target vehicle ranges from 45° to 135°; the target vehicle moves in the opposite direction of the host vehicle when the course angle of the target vehicle ranges from 135° to 225°; the target vehicle moves to the right of the host vehicle when the course angel of the target vehicle ranges from 225° to 315°. Reflectivity information is stored in the simulation environment; and when an object reflectivity chart is to be drawn, the horizontal axis may represent the rotation angle of the target vehicle and the vertical axis may represent the object reflectivity.

Figure 3:
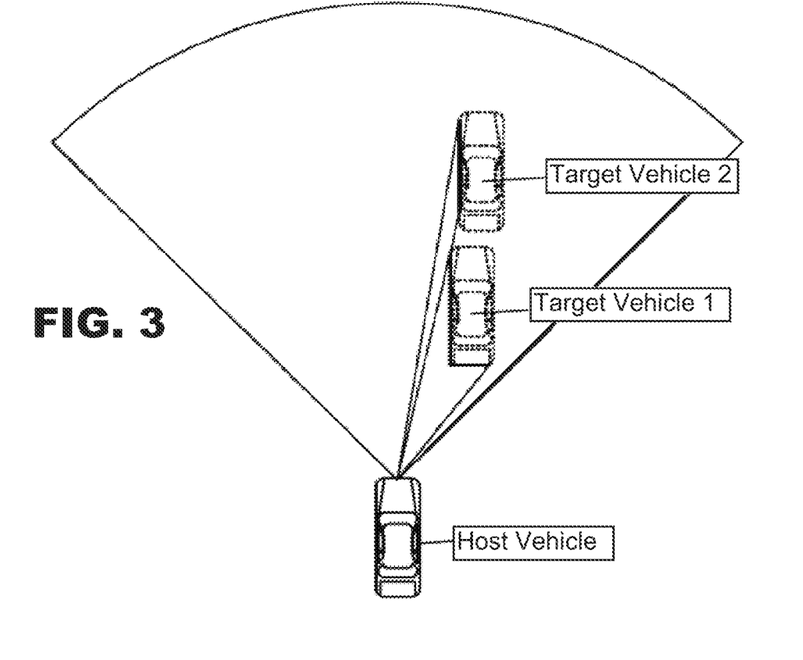
FIG. 3 is a schematic diagram illustrating a visible section of the target vehicle from geometry culling.
Figure 4:
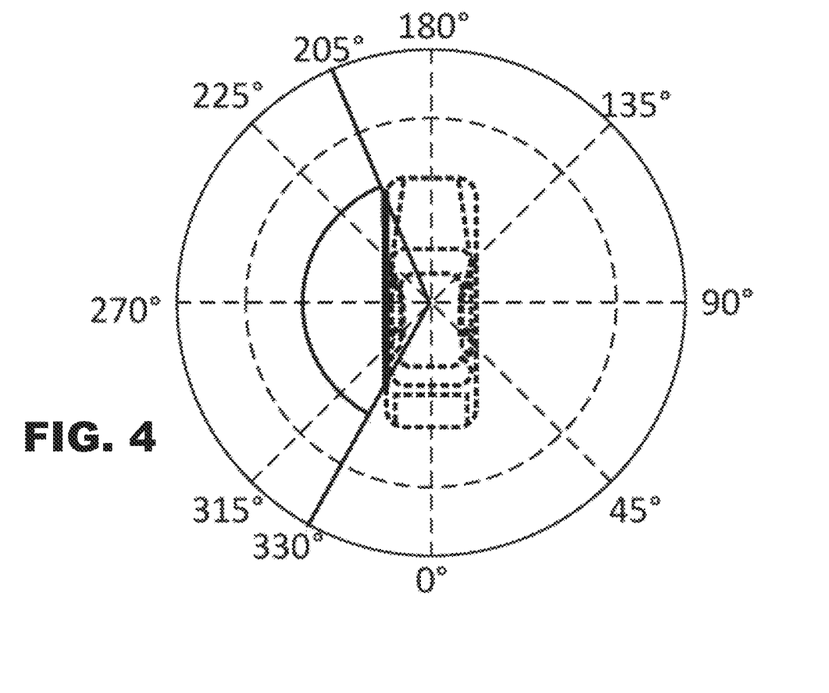
FIG. 4 is a schematic diagram illustrating a correspondence between the angle and the visible section of the target vehicle.

Step 2: Target vehicle reflection intensity simulation, which may include: for each traffic participant obtained in Step 1 performing geometry culling on the object, discarding completely-invisible target vehicles, and calculating visible section information for each target vehicle that has a visible section, the visible section information including a position of the visible section and a corresponding angle. In FIG. 3 a target vehicle 2 has a visible section marked with solid lines. The angle corresponding to the position of the visible section is 205° to 330°, as shown in FIG. 4.

In reflection intensity calculation, target vehicles can be categorized into four classes according to their moving directions relative to the host vehicle, and each class can further be divided into three situations according to the positional relationship between the visible section and the host vehicle; in each of the situations a different method is used to calculate the reflection intensity.

Figure 5A:
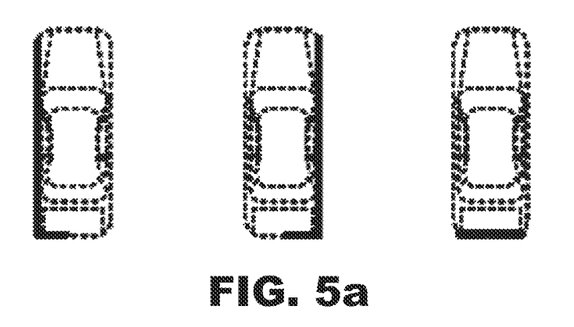
FIG. 5a illustrates the relative position of a target vehicle visible section on the target vehicle when the target vehicle moves in the same direction as the host vehicle.

FIG. 5a shows Class I where the target vehicle moves in the same direction as the host vehicle, including three situations: $f_{lrcorner}$ feature, $f_{rrcorner}$ feature and $f_{rearside}$ feature. The $f_{lrcorner}$ feature indicates that the target vehicle visible section starts from the center of the rear end of the vehicle and runs the contour of the vehicle to the top left corner. The $f_{rrcorner}$ feature indicates that the target vehicle visible section starts from the center of the rear end of the vehicle and runs the contour of the vehicle to the top right corner. The $f_{rearside}$ feature indicates that the target vehicle visible section starts from the left side to the right side of the rear end of the vehicle. Object reflection intensity calculation may include finding a reflectivity of the target vehicle at a corresponding area from the calibrated reflectivities according to the position and angle of the current target vehicle, determining a situation in the class according to the position of the visible section, and obtaining an object reflection intensity of the target vehicle by calculating an integral on an angle interval corresponding to the visible section and multiplying the height of the target vehicle type.

Figure 5B:
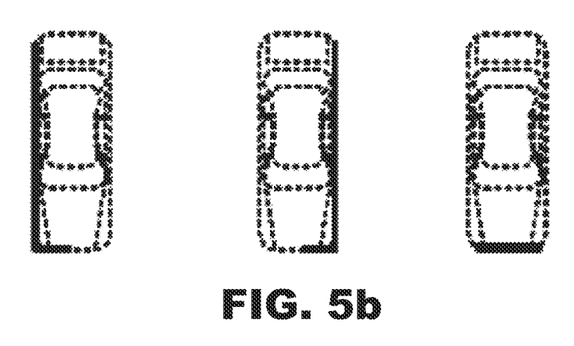
FIG. 5b illustrates the relative position of a target vehicle visible section on the target vehicle when the target vehicle moves in the opposite direction of the host vehicle.

FIG. 5b shows Class II where the target vehicle moves in the opposite direction of the host, including three situations: $f_{rfcorner}$ corner feature, $f_{lfcorner}$ feature, and $f_{frontside}$ feature. The $f_{rfcorner}$ feature indicates that the target vehicle visible section starts from the center of the front end of the vehicle and runs the contour of the vehicle to the top right corner. The $f_{lfcorner}$ feature indicates that the target vehicle visible section starts from the center of the front end of the vehicle and runs the contour of the vehicle to the top left corner. The $f_{frontside}$ feature indicates that the target vehicle visible section starts from the left side to the right side of the front end of the vehicle. Object reflection intensity calculation may include finding a reflectivity of the target vehicle at a corresponding area from the calibrated reflectivities according to the position and angle of the current target vehicle, determining a situation in the class according to the position of the visible section, and obtaining an object reflection intensity of the target vehicle by calculating an integral on an angle interval corresponding to the visible section and multiplying the height of the target vehicle type.

Figure 5C:
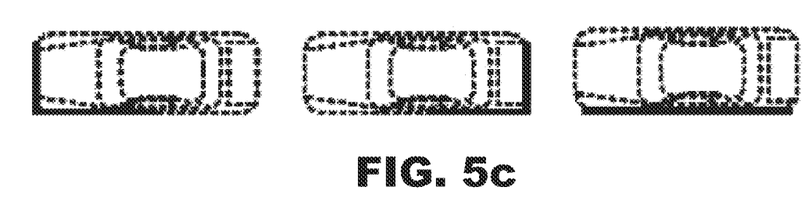
FIG. 5c illustrates the relative position of a target vehicle visible section on the target vehicle, when the target vehicle moves to the left relative to the host vehicle.

FIG. 5c shows Class III where the target vehicle moves to the left relative to the host vehicle, including three situations: $f_{flcorner}$ feature, $f_{rlcorner}$ feature, and $f_{leftside}$ feature. The $f_{flcorner}$ feature indicates that the target vehicle visible section starts from the center of the left side of the vehicle and runs the contour of the vehicle to the top corner at the front end. The $f_{rlcorner}$ feature indicates that the target vehicle visible section starts from the center of the left side of the vehicle and runs the contour of the vehicle to the top corner at the rear end. The $f_{leftside}$ feature indicates that the target vehicle visible section starts from the front to the end of the left side of the vehicle. Object reflection intensity calculation may include finding a reflectivity of the target vehicle at a corresponding area from the calibrated reflectivities according to the position and angle of the current target vehicle, determining a situation in the class according to the position of the visible section, and obtaining an object reflection intensity of the target vehicle by calculating an integral on an angle interval corresponding to the visible section and multiplying the height of the target vehicle type.

Figure 5D:
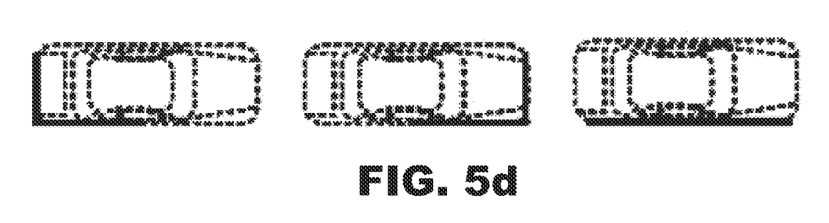
FIG. 5d illustrates the relative position of a target vehicle visible section on the target vehicle, when the target vehicle moves to the right relative to the host vehicle.

FIG. 5d shows Class IV where the target vehicle moves to the right of the host vehicle, including three situations: $f_{rrcorner}$ feature, $f_{rfcorner}$ feature, and $f_{rightside}$ feature. The $f_{rrcorner}$ feature indicates that the target vehicle visible section starts from the center of the right side of the vehicle and runs the contour of the vehicle to the top corner at the rear end. The $f_{rfcorner}$ feature indicates that the target vehicle visible section starts from the center of the right side of the vehicle and runs the contour of the vehicle to the top corner at the front end. The $f_{rightside}$ feature indicates that the target vehicle visible section starts from the front to the end of the left side of the vehicle. Object reflection intensity calculation may include finding a reflectivity of the target vehicle at a corresponding area from the calibrated reflectivities according to the position and angle of the current target vehicle, determining a situation in the class according to the position of the visible section, and obtaining an object reflection intensity of the target vehicle by calculating an integral on an angle interval corresponding to the visible section and multiplying the height of the target vehicle type.

In FIG. 3, the target vehicle 2 is not completely occluded. According to information obtained from a target information detection module, the target vehicle 2 moves in the same direction as the host vehicle, and thus belongs to Class I. Furthermore, since the calculated visible section information shows the visible section is on the left side of the target vehicle, the target vehicle 2 belongs to the first situation under Class I; hence the reflection intensity calculation is to be done according to that situation. The angle corresponding to the position of the visible section is 205° to 330°; an object reflectivity distribution list can be obtained from the target information detection module; then a reflection intensity of the target vehicle is obtained by calculating an integral and multiplying an obtained height of the vehicle; and the reflection intensity of the target vehicle is stored into an object reflection intensity result list pending further processing.

That is, in the case where the course angle of the target vehicle changes relative to the host vehicle, processing is done according to Class I when the course angle of the target vehicle ranges from 0 to 45° or 315° to 360°; processing is done according to Class III when the course angle of the target vehicle ranges from 45° to 135°; processing is done according to Class II when the course angle of the target vehicle ranges from 135° to 225°; processing is done according to Class IV when the course angle of the target vehicle ranges from 225° to 315°.

Figure 6:
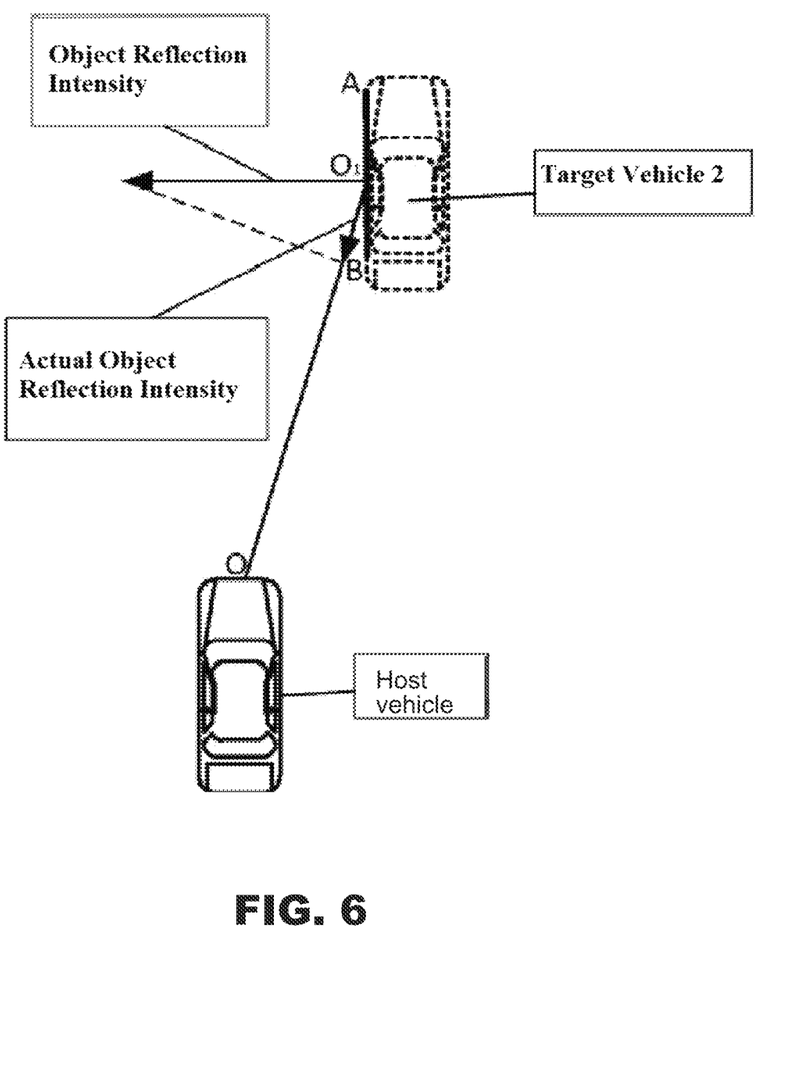
FIG. 6 illustrates the vector projection of a reflection intensity.

In the two situations above for reflection intensity calculation, it is assumed that the reflection of each point of the target is directly in front of the vehicle; however, the actual object reflection intensity needs to take into account the angle between the target vehicle and the radar, which causes refraction loss. According to an embodiment of the invention, a position vector of the current target vehicle relative to the radar is calculated, and a vector projection of the obtained reflection intensity is calculated. As shown in FIG. 6, in the example above of the calculation of the visibility intensity of the target vehicle 2, the visible section has endpoints A and B, the midpoint of the line AB is $O_1$, with O being the mounting position of the radar (origin), the actual object reflection intensity is the vector projection of the obtained reflection intensity onto $OO_1$.

Figure 7:
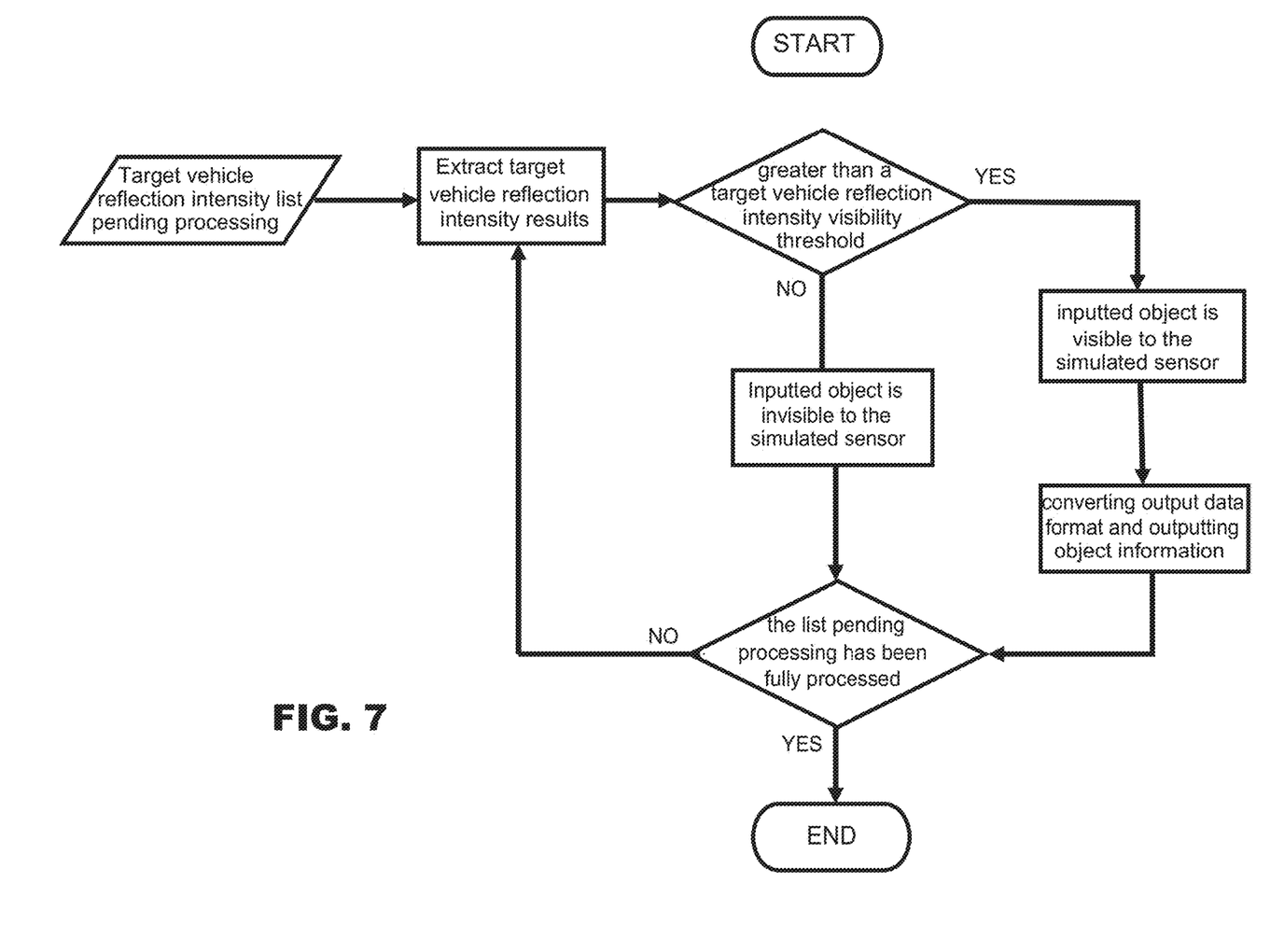
FIG. 7 is a flow chart of the visibility determination module.

Step 3: visibility determination, which may include: analyzing the visibility of the target vehicle according to the target vehicle reflection intensity calculated from Step 2, and converting and outputting information of a visible object into an expression form of a real millimeter-wave radar sensing an object. As shown in FIG. 7, the workflow mainly includes:

sequentially extracting relevant data from the target vehicle reflection intensity result list obtained from step 2, determining whether a target vehicle reflection intensity result is greater than a target vehicle reflection intensity visibility threshold in the simulated sensor, and if the target vehicle reflection intensity result is greater than the target vehicle reflection visibility intensity threshold, determining the inputted object is visible to the simulated sensor, and converting and outputting the information of the target vehicle such as position, angle, speed and acceleration obtained in the simulation scene according to an output data format required by the current radar model. If necessary, the distance, angle, speed and acceleration of the current target is converted into polar coordinates and output. Then it is determined whether the list pending processing has been fully processed, if so, the operation of the module ends; otherwise, the next target vehicle reflection intensity pending processing is extracted. If the target vehicle reflection intensity result is not greater than the target vehicle reflection intensity visibility threshold, it is determined that the inputted object is invisible to the simulated sensor. Then it is determined whether the list pending processing has been fully processed, if so, the operation of the module ends; otherwise, the next target vehicle reflection intensity pending processing is extracted.

The target vehicle intensity visibility threshold is defined as a reflection intensity value of the target vehicle when the simulated sensor can effectively identify the target vehicle.

Figure 8A:
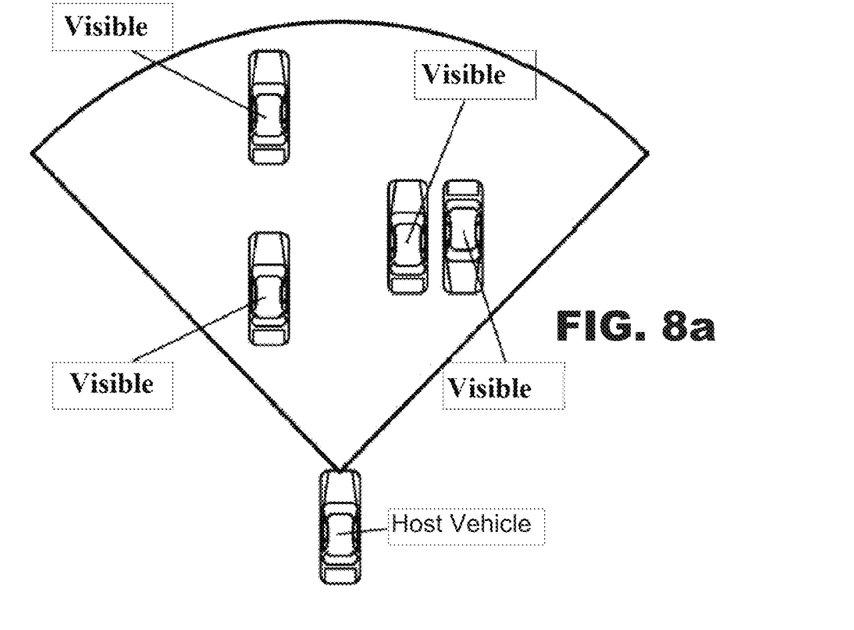
FIG. 8a is a schematic diagram illustrating a reflection intensity-based determination result where the objects are visible.
Figure 8B:
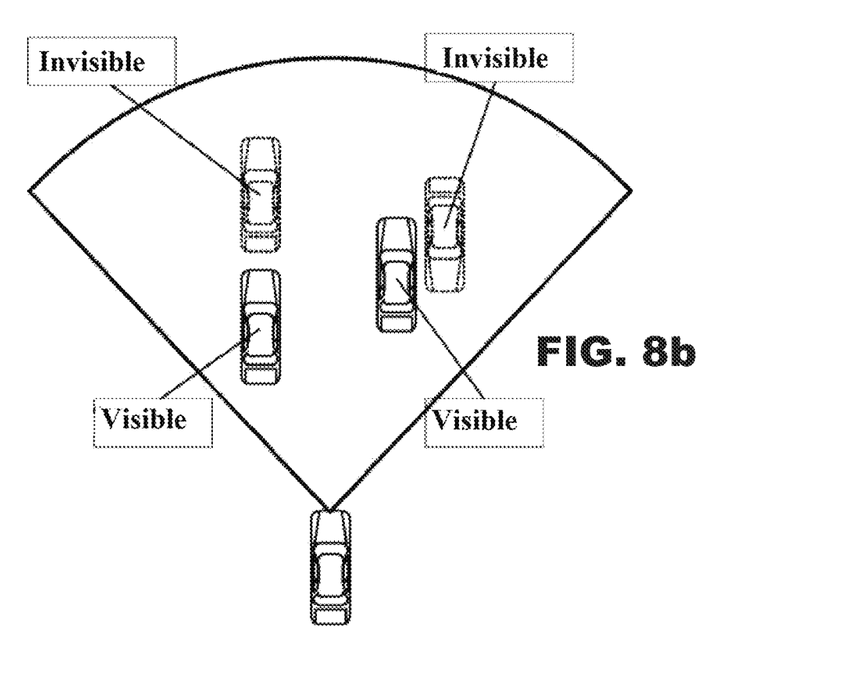
FIG. 8b is a schematic diagram illustrating a reflection intensity-based determination result where the objects are invisible.

FIG. 8a and FIG. 8b illustrate final visibility results on display.

The invention claimed is:

1. A millimeter wave radar modeling-based method for object visibility determination, comprising the steps of:

obtaining information of a target vehicle at a variety of positions and a variety of angles within a detection area of a host vehicle, wherein the target vehicle is detected by the host vehicle, and the information comprises a vehicle type, shape, size, material, position, speed, acceleration, moving direction and reflectivity of the target vehicle, according to vehicle types stored in an intelligent vehicle simulation testing model, and calibrated reflectivities of the vehicle types at a variety of positions within 360 degrees within a millimeter wave radar, and building a linked list for storage;

performing geometry culling on each target vehicle, discarding completely invisible target vehicles, and calculating visible section information for each target vehicle that has a visible section, the visible section information including a position of the visible section and a corresponding angle;

categorizing target vehicles into four classes according to their moving directions relative to the host vehicle, including (i) the target vehicle moves in the same direction as the host vehicle; (ii) the target vehicle moves in the opposite direction of the host vehicle; (iii) the target vehicle moves to the left relative to the host vehicle; and (iv) the target vehicle moves to the right relative to the host vehicle; and further dividing each class into a plurality of situations according to a positional relationship between the visible section and the host vehicle, and calculating a target vehicle reflection intensity according to the situation; wherein the target vehicle reflection intensity calculation further comprises finding a reflectivity of the target vehicle at a corresponding area from the calibrated reflectivities according to the position and angle of the current target vehicle, determining a situation in a class according to the position of the visible section, and obtaining an object reflection intensity of the target vehicle by calculating an integral on an angle interval corresponding to the visible section and multiplying by a height of the target vehicle type; and analyzing visibility of the target vehicle according to the target vehicle reflection intensity, and outputting information of a visible target vehicle in an expression form of a real millimeter-wave radar sensing an object.

2. The millimeter wave radar modeling-based method for object visibility determination according to claim 1, wherein the class where the target vehicle moves in the same direction as the host vehicle includes three situations & $f_{lrcorner}$ feature, $f_{rrcorner}$ feature and $f_{rearside}$ feature, wherein:

the $f_{lrcorner}$ feature indicates that the target vehicle visible section starts from the center of the rear end of the vehicle and runs the contour of the vehicle to the top left corner;

the $f_{rrcorner}$ feature indicates that the target vehicle visible section starts from the center of the rear end of the vehicle and runs the contour of the vehicle to the top right corner;

the $f_{rearside}$ feature indicates that the target vehicle visible section starts from the left side to the right side of the rear end of the vehicle.

3. The millimeter wave radar modeling-based method for object visibility determination according to claim 1, wherein the class where the target vehicle moves in the opposite direction of the host includes three situations $f_{rfcorner}$ feature, $f_{lfcorner}$ feature, and $f_{frontside}$ feature, wherein:

the $f_{rfcorner}$ feature indicates that the target vehicle visible section starts from the center of the front end of the vehicle and runs the contour of the vehicle to the top right corner;

the $f_{lfcorner}$ feature indicates that the target vehicle visible section starts from the center of the front end of the vehicle and runs the contour of the vehicle to the top left corner;

the $f_{frontside}$ feature indicates that the target vehicle visible section starts from the left side to the right side of the front end of the vehicle.

4. The millimeter wave radar modeling-based method for object visibility determination according to claim 1, wherein the class where the target vehicle moves to the left relative to the host vehicle includes three situations $f_{flcorner}$ feature, $f_{rlcorner}$ feature, and $f_{leftside}$ feature, wherein:

the $f_{flcorner}$ feature indicates that the target vehicle visible section starts from the center of the left side of the vehicle and runs the contour of the vehicle to the top corner at the front end;

the $f_{rlcorner}$ feature indicates that the target vehicle visible section starts from the center of the left side of the vehicle and runs the contour of the vehicle to the top corner at the rear end;

the $f_{leftside}$ feature indicates that the target vehicle visible section starts from the front to the end of the left side of the vehicle.

5. The millimeter wave radar modeling-based method for object visibility determination according to claim 1, wherein in the class where the target vehicle moves to the right of the host vehicle includes three situations $f_{rrcorner}$ feature, $f_{rfcorner}$ feature, and $f_{rightside}$ feature, wherein:

the $f_{rrcorner}$ feature indicates that the target vehicle visible section starts from the center of the right side of the vehicle and runs the contour of the vehicle to the top corner at the rear end;

the $f_{rfcorner}$ feature indicates that the target vehicle visible section starts from the center of the right side of the vehicle and runs the contour of the vehicle to the top corner at the front end;

the $f_{rightside}$ feature indicates that the target vehicle visible section starts from the front to the end of the left side of the vehicle.

6. The millimeter wave radar modeling-based method for object visibility determination according to claim 1, wherein the case where the course angle of the target vehicle changes relative to the host vehicle:

the target vehicle moves in the same direction as the host vehicle when the course angle of the target vehicle ranges from 0 to 45° or 315° to 360° counterclockwise;

the target vehicle moves to the left relative to the host vehicle when the course angle of the target vehicle ranges from 45° to 135° counterclockwise;

the target vehicle moves in the opposite direction of the host vehicle when the course angle of the target vehicle ranges from 135° to 225° counterclockwise;

the target vehicle moves to the right of the host vehicle when the course angel of the target vehicle ranges from 225° to 315° counterclockwise.

7. The millimeter wave radar modeling-based method for object visibility determination according to claim 1, further comprising the steps of:

calculating a vector projection of the obtained reflection intensity, considering the angle between the target vehicle and the radar which causes refraction loss, and based on calculating a position vector of the current target vehicle relative to the radar, and obtaining an actual object reflection intensity by calculating the vector projection of the obtained reflection intensity onto the line segment $OO_1$ wherein if the visible section has endpoints A and B, the midpoint of the line AB is $O_1$ and the mounting position of the radar is O.

8. The millimeter wave radar modeling-based method for object visibility determination according to claim 1, wherein the visibility determination further comprises the steps of:

sequentially extracting relevant data from the target vehicle reflection intensity result list, determining whether a target vehicle reflection intensity result is greater than a target vehicle reflection intensity visibility threshold in the simulated sensor, and if the target vehicle reflection intensity result is greater than the target vehicle reflection visibility intensity threshold, determining the inputted object is visible to the simulated sensor, and converting and outputting the information of the target vehicle such as position, angle, speed and acceleration obtained in the simulation scene according to an output data format required by the current radar model; if the target vehicle reflection intensity result is less than or equal to the target vehicle reflection intensity visibility threshold, determining the inputted object is invisible to the simulated sensor.

* * * * *